(12) United States Patent
Saric et al.

(10) Patent No.: US 12,404,882 B2
(45) Date of Patent: Sep. 2, 2025

(54) VALVE ARRANGEMENT AND METHOD FOR INSTALLING A VALVE ARRANGEMENT

(71) Applicant: Festo SE & Co. KG, Esslingen (DE)

(72) Inventors: Boris Saric, Esslingen (DE); Eduard Wenske, Kornwestheim (DE); Ralf Starzmann, Reichenbach (DE)

(73) Assignee: Festo SE & Co. KG, Esslingen (DE)

( * ) Notice: Subject to any disclaimer, the term of this patent is extended or adjusted under 35 U.S.C. 154(b) by 21 days.

(21) Appl. No.: 18/613,781

(22) Filed: Mar. 22, 2024

(65) Prior Publication Data

US 2024/0328438 A1 Oct. 3, 2024

(30) Foreign Application Priority Data

Mar. 27, 2023 (DE) ..................... 10 2023 107 648.5

(51) Int. Cl.
*F15B 13/08* (2006.01)
*F15B 13/02* (2006.01)
*F16K 11/22* (2006.01)
*F16K 31/02* (2006.01)

(52) U.S. Cl.
CPC ...... *F15B 13/0825* (2013.01); *F15B 13/0817* (2013.01); *F15B 13/0857* (2013.01); *F15B 13/02* (2013.01); *F15B 13/0814* (2013.01); *F15B 13/0839* (2013.01); *F15B 13/0853* (2013.01); *F15B 13/086* (2013.01); *F15B 13/0875* (2013.01); *F15B 2211/6336* (2013.01); *F16K 11/22* (2013.01); *F16K 31/02* (2013.01)

(58) Field of Classification Search
CPC .............. F15B 13/0825; F15B 13/0817; F15B 13/0857; F15B 13/0839; F15B 13/086; F15B 13/0875; F15B 13/0814; F15B 13/0853; F15B 13/02; F15B 2211/6336; F16K 11/22; F16K 31/02
USPC ........................................... 137/15.21, 487.5
See application file for complete search history.

(56) References Cited

U.S. PATENT DOCUMENTS

| | | | | |
|---|---|---|---|---|
| 5,277,622 A | * | 1/1994 | Liljenberg | H01R 9/2408 439/499 |
| 5,301,717 A | * | 4/1994 | Goedecke | F15B 13/0857 137/884 |
| 5,348,047 A | * | 9/1994 | Stoll | F15B 13/0821 137/554 |
| 5,929,536 A | * | 7/1999 | Stoll | F15B 13/0832 307/42 |

(Continued)

FOREIGN PATENT DOCUMENTS

EP 0 952 359 B1 7/2006

*Primary Examiner* — Minh Q Le
(74) *Attorney, Agent, or Firm* — HSML P.C.

(57) ABSTRACT

A method of installing and a valve arrangement having a valve unit, such a valve unit having a valve section and an input section arranged on the valve section. The valve section contains at least one electrically actuable directional valve, which is assigned an input module of the input section, that is equipped with plug-in connectors for the connection of sensor plugs. The input module can be installed in a use position on a connector carrier of the input section, so that the sensor plugs through the connector carrier are connected to an internal communication structure suitable for the transmission of sensor signals.

20 Claims, 7 Drawing Sheets

(56) References Cited

U.S. PATENT DOCUMENTS

| | | | | |
|---|---|---|---|---|
| 6,109,298 A * | 8/2000 | Kaneko | F15B 13/0828 | 137/884 |
| 6,173,731 B1 | 1/2001 | Ottliczky | | |
| 6,213,153 B1 * | 4/2001 | Hayashi | F15B 13/0817 | 137/884 |
| 6,216,740 B1 * | 4/2001 | Hayashi | F15B 13/0875 | 137/884 |
| 6,468,092 B1 * | 10/2002 | Graff | F15B 13/0839 | 439/76.1 |
| 7,204,273 B1 * | 4/2007 | Zub | F15B 13/0875 | 137/884 |
| 8,074,680 B2 * | 12/2011 | De Carolis | F15B 13/0857 | 439/717 |
| 9,531,095 B1 * | 12/2016 | Jiang | H01R 13/514 | |
| 2002/0029809 A1 * | 3/2002 | Miyazoe | F15B 13/086 | 137/554 |
| 2006/0219305 A1 * | 10/2006 | Bordonaro | F15B 13/0817 | 137/625.65 |
| 2006/0240682 A1 * | 10/2006 | Kuhbauch | F15B 13/0839 | 439/1 |
| 2007/0133153 A1 * | 6/2007 | Moeker | F15B 13/0814 | 361/679.41 |
| 2007/0278436 A1 * | 12/2007 | Phillips | F15B 13/0857 | 251/129.03 |
| 2009/0045361 A1 * | 2/2009 | Nolle | F15B 13/086 | 251/12 |
| 2009/0045367 A1 * | 2/2009 | Lee | F15B 13/0839 | 251/129.15 |
| 2009/0114865 A1 * | 5/2009 | Homann | F16K 27/003 | 251/129.15 |
| 2009/0139591 A1 * | 6/2009 | Okamoto | F15B 13/0825 | 137/884 |
| 2010/0148101 A1 * | 6/2010 | Narita | F15B 13/0839 | 251/129.01 |
| 2018/0202473 A1 * | 7/2018 | Wang | F15B 13/0857 | |
| 2019/0195246 A1 * | 6/2019 | Jamison | F15B 13/0814 | |
| 2019/0264712 A1 * | 8/2019 | Lucidera | F15B 13/0878 | |
| 2020/0173466 A1 * | 6/2020 | Bhongade | H01R 13/622 | |
| 2020/0232483 A1 * | 7/2020 | Biwersi | F16K 27/003 | |

* cited by examiner

VALVE ARRANGEMENT AND METHOD FOR INSTALLING A VALVE ARRANGEMENT

This application claims priority to German Patent Application No. 10 2023 107 648.5 filed Mar. 27, 2023 which is incorporated by reference.

The invention relates to a valve arrangement, —having a valve unit extending in a principal direction along a principal axis, such valve unit having a valve section with at least one electrically actuable directional valve and an input section arranged adjacent to the valve section, in this respect in the principal direction, with a plurality of electrical inputs designed for the reception of electrical sensor signals, wherein each electrical input has an electromechanical plug-in connector for releasably connecting a sensor plug arranged on a sensor cable connected to a sensor, —wherein the valve unit has a communication structure electrically connected to the at least one directional valve and the electrical inputs, such communication structure being designed for the electrical transmission of valve control signals determined for the directional valve and of electrical sensor signals received via the electrical inputs, —wherein the input section has a connector carrier attached to the valve section carrying the electromechanical plug-in connectors of the electrical inputs, —and wherein the at least one directional valve is assigned a pair of inputs comprising two adjacent electrical inputs.

The invention also relates to a method for installing such a valve arrangement.

One such valve arrangement is described in the catalogue "Der Pneumatic-Katalog 97/98" from Festo AG & Co., issue 97/98, European programme, 33rd edition, pages 6.4/14-1 and 6.4/14-3, and includes a valve unit described as a valve terminal, comprising a plurality of electrically actuable directional valves mounted on a terminal block, which can be actuated by means of electrical valve control signals, which are supplied by a control block via an internal communication structure. The valve terminal is also equipped with a plurality of electrical inputs, each input having an electromechanical plug-in connector attached to a housing-type sensor carrier, to which a sensor arranged on a pneumatic cylinder can be connected, the sensor signals of which are taken into account in the electrical actuation of the directional valves. A pair of inputs consisting of two adjacent electrical inputs can be assigned to each valve, via which the two end positions of a pneumatic cylinder that can be actuated by the directional valve can be fed back. To be able to attach the sensor plugs, which are connected to a sensor via a sensor cable, to the electromechanical plug-in connectors easily, a relatively large distance is provided between the plug-in connectors of an input pair, which disadvantageously affects the size of the valve terminal or valve unit.

From EP 0 952 359 B1 a modular electrofluidic building block system that has modules comprising a fluidic module, an electrical module and at least one functional part is known. A feedback module can be assigned to the electrical module, which is preferably snapped onto the rear of the electrical module.

SUMMARY OF THE INVENTION

The problem underlying the invention is to create a valve arrangement which allows for a convenient and correctly assigned connection of sensor plugs to the electrical inputs in a simple and compact structure. Further, a method for installing such a valve arrangement, which can be implemented in a simple and time-saving manner, is to be provided.

To solve this problem, a valve arrangement, in conjunction with the aforesaid characteristics, is provided that the two electromechanical plug-in connectors of the input pair are arranged on an input module of the input section separate from the connector carrier, such input module also having two electromechanical module connectors each electromechanically connected to one of the two electromechanical plug-in connectors, wherein the input module, in the connected state to the plug-in connectors of the sensor plugs, can be or is releasably mounted on a module assembly point designed on the connector carrier when adopting the use position, in which it firstly engages in a centred position with its two module connectors in centring structures of the connector carrier and, secondly is in electrical contact with the electrical carrier contacts of the connector carrier arranged on the module assembly point and electrically connected to the communication structure, wherein an attachment device is assigned to the input module, with which, in the connected state to the plug-in connectors of the sensor plugs, it can be releasably attached in its use position to the connector carrier.

The problem is also solved by a method for installing a valve arrangement designed in the above sense, characterised in that, in a handling position having been removed from the connector carrier, the sensor plugs of the input module which has been assigned at least one directional valve are connected to the plug-in connectors of the input module, after which the input module is set, together with the sensor plugs attached to it, in the use position on the connector carrier and attached to the connector carrier by means of the attachment device.

In this manner, the electromechanical plug-in connectors are designed as components of at least one input module, which is releasably attached to the connector carrier in a use position so as to provide the desired electrical connection between the plug-in connectors and the communication structure of the valve unit. For the releasable attachment, an attachment device is present, by which the input module is securely attachable or attached to the connector carrier in the use position and which enables the input module to be removed if required from its use position on the connector carrier and handled individually as required. With the input module in its state removed from the connector carrier, which for better distinction is also described as the handling position of the input module, the sensor plugs can be conveniently connected to the plug-in connectors and also removed again if necessary, since the plug-in connectors are very easily accessible. For example, in the handling position, the input module can be held in one hand in order to attach or remove the sensor plugs at the same time with the other hand. If the valve unit contains only one single directional valve, usefully only one single input module is also present. If the valve unit has a plurality of directional valves, it is advantageous if one of a plurality of input modules is assigned to a plurality or all of the directional valves, each input module having two plug-in connectors from a pair of inputs consisting of two inputs. Preferably, the number of input modules corresponds to the number of directional valves. Independent of the number of input modules, each input module on the connector carrier is assigned its own module assembly point, on which it can be releasably mounted when adopting the use position, with the aid of the attachment device assigned to it. The input module has two electromechanical module connectors, which are designed to fit the centring structures of the connector carrier in which they engage when the input module is positioned on a module assembly point. With this, the input module undergoes a mechanical position centring, in other words a predetermined positioning in relation to the connector carrier and, accordingly, also in relation to the assigned directional valve. When positioning on the module assembly point, the two module connectors, each of which is in contact with one of the electromechanical connectors, connect electrically with the connector carrier contacts, which are in electrical contact with the communication structure. In this manner, sensor signals originating from a sensor, which are fed into one of the inputs via a sensor plug, can be transmitted to the communication structure to be taken into account when the assigned directional valve is electrically actuated. The electrical inputs are, in particular, digital inputs which enable precise capture and evaluation of the operating state of, in particular, a pneumatic drive operated by means of the assigned directional valve. Since the sensor plugs can be taken out the use position and connected in a handling position of the input module and removed again if necessary, it is possible to arrange the plug-in connectors arranged on the input module very closely together without adversely affecting with the connection process, which overall permits the input section and thus the entire valve unit to be achieved with compact dimensions.

Advantageous developments of the invention are derived from the subclaims.

The input module is usefully arranged lying on a line in its use position with the assigned directional valve in the principal direction. This facilitates a visual assignment between the plug-in connectors and the corresponding directional valve, particularly with a preferred multiple arrangement of directional valves and input modules. For the benefit of compact transverse dimensions of the valve unit, the two plug-in connectors of the respective input module are preferably arranged successively in the principal direction.

The input module is usefully designed to be rectangular-shaped, which makes it easier to handle with compact dimensions. Preferably, the input module has a one-part or multiple-part module body made of plastic material, in which the electrical contacts of the plug-in connectors and the module connectors required for the electrical connections are fixed and electrically connected to each other.

To describe the valve unit, a Cartesian coordinate system can be used, consisting of a principal axis, a transverse axis orthogonal to the principal axis, and a vertical axis orthogonal to the principal axis and the transverse axis. The plug-in connectors are arranged on each existing input module, in particular on a top side of the module, which is orientated in the use position of the relevant input module in an axial direction of the vertical axis, described as the vertical direction. The module connectors are located preferably on a bottom side of the input module opposite the top side of the module in the vertical direction. The carrier contacts of the connector carrier are in turn preferably arranged upward-facing on a top side of the connector carrier orientated in the vertical direction. Consequently, assembly and removing the input modules in relation to the connector carrier can be conveniently achieved from a top side of the valve unit, which is also orientated in the vertical direction.

The valve unit can in principle be operated in any spatial orientation, for example with a vertical upward-facing top side or also with a horizontally aligned top side.

The connector carrier is usefully designed at least essentially in a plate shape, wherein it extends with its main extension in a plate plane, in particular, which is orthogonally aligned with the vertical axle.

In a preferred design, the connector carrier has a carrier housing attached to the valve section of the valve unit that contains an enclosure. The enclosure houses an electrical conductor arrangement, which has the electric carrier contacts and which is electrically connected to the communication structure. The at least one module assembly point is designed on a housing wall of the carrier housing adjacent to the housing interior, which for better distinction is also described as a mounting wall, wherein this has mounting wall has a wall aperture in the area of each carrier contact, which forms one of the centring structures for the position centring of an input module. In the use position, the input module with its module connectors immerse into the wall apertures, wherein the desired position centring is achieved due to a cross-support. At the same time, the module connectors are in electrical contact with the respective assigned carrier contacts of the electrical conductor arrangement.

The electrical conductor arrangement of the connector carrier contains preferably at least one circuit board. The carrier contacts are arranged on the at least one circuit board. If the input section has a plurality of input modules, the carrier contacts used to connect a plurality of or all input modules can be arranged on the same circuit board of the electrical conductor arrangement.

For the position centring in relation to the connector carrier, each module connector usefully has an cylindrical centring projection, which immerses centrally into one of the wall apertures of the carrier housing, when adopting the use position. On the end face of each centring projection, a plurality of module contacts are arranged, each of which is designed to contact one of the carrier contacts and which are electrically connected to one of the two plug-in connectors inside the input module. Each plug-in connector usefully has a plurality of electrical contacts described as connector contacts, each of which is electrically connected to one of the module contacts.

The carrier housing of the connector carrier can be connected in one piece to the valve section, which allows for cost-effective production, in particular in an injection moulding process. However, a construction is preferred, in which the carrier housing is designed separately in relation to the valve section, wherein it is set on the valve section and attached to the valve section by means of its own housing attachment device. This construction permits the valve unit to operate without an input section, if necessary. Furthermore, it is optionally possible to equip the same valve section with different input sections.

The electrical conductor arrangement of the input section is usefully designed separately in relation to the communication structure, which is in contact with the at least one directional valve, and is electrically conductively connected to the communication structure via an electrical connection device, for example an electrical plug-in connector device. The electrical communication structure, like the electrical conductor arrangement, can be built based on at least one circuit board.

The electromechanical plug-in connectors of the input module are each usefully designed as a multipole and in particular a three-pole connector with thread, usefully as M8 connectors and preferably as M8 sockets. Each connector with thread has a mounting thread that permits a releasable screw fixing of the plugged-in sensor plug.

Preferably, a sensor mating face and a corresponding opposite module surface area is designed externally on each of the two input modules. The two electromechanical plug-in connectors are located on the sensor mating face and the two module connectors are located at the module surface area. The sensor mating face is usefully located on a module top side and the module surface area is located on a module bottom side of the input module.

It is advantageous if each input module has an illuminated display device, which is able to visualise the electrical sensor signals received. Preferably, the illuminated display device contains an optical fibre structure penetrating the input module, which has at least one light output surface arranged on the module top side and at least one light coupling surface arranged in the area of the module bottom side. In the use position of the input module, the light coupling surface is opposite a light output surface of the connector carrier, which is in particular a component of an electrical conductor arrangement of the connector carrier. Each plug-in connector is usefully assigned its own light conductor, so that, for example, there is the possibility to optically display at least one switching state of connected sensors and thus to visualise, for example, the two stroke end positions of a fluid-operated drive that can be detected by connected sensors.

The attachment device assigned to each input module is usefully designed as a screw fixing device. Compared to, for example, a design which is also possible in principle as a rest attachment device, this permits a particularly reliable and yet simple fixing of the use position of the relevant input module.

The attachment device, which is designed as a screw fixing device, usefully has a fixing screw which penetrates the input module and an fixing nut which is fixed in the connector carrier, for example a clamped, moulded or integrally designed. In the area of the two plug-in connectors and consequently usefully in the area of a module top side, the fixing screw has a screw head, on which a manually manageable screwing tool, in particular a screwdriver, can be attached to tighten or loosen the fixing screw. Preferably, a through-hole penetrating the input module, in which the fixing screw extends, is placed so that the screw head is arranged on a module top side between the two plug-in connectors of the input module.

The at least one directional valve is usefully able to control the pressurisation of at least one working channel designed in the valve section, which is provided for fluidic connection to a fluid-operated drive, designed in particular as a pneumatic drive. Usefully, each directional valve is connected to two working channels. Through electrical actuation by means of the aforesaid valve control signals, which are usefully provided by an electronic control unit, each existing directional valve can connect the at least one assigned working channel either to a feed channel designed in the valve section or to a vent channel also designed in the valve section in order to supply or vent a connected drive with pressurised fluid. During operation of the valve arrangement, the feed channel communicates with an external pressure source, in particular a compressed air source, while the vent channel is connected to the atmosphere.

The at least one electrically actuable directional valve is in particular an electropneumatically piloted directional valve. In this respect, it usefully has a main valve and an electrically actuable pilot valve device, combined with the main valve into an assembly. Alternatively, the directional valve can also be designed as a directly electrically actuable directional valve.

The valve section usefully contains a base body to which the input section is attached. The base body is usefully made of plastic. The input section is usefully fixed to the base body with a preferably existing carrier housing.

Preferably, the at least one directional valve is designed as a component separate in relation to the base body, which is mounted on a valve mounting surface of the base body, making it possible to simply replace the directional travel valve without impacting the input section if required. Preferably, the valve mounting surface has the same spatial orientation as each assembly point assigned to a valve. Thus, the input modules and the directional valves can be mounted and removed independently of each other from the same side.

Each directional valve is preferably separate in relation to the base body and has a valve housing separate in relation to the base body. In an alternative construction, the base body assumes the function of the valve housing directly.

As mentioned above, in a simple construction the valve unit can have only one single directional valve and one single input module in a simple design. However, in particular in the context of more complex automation tasks, it is advantageous if the valve unit has a plurality of directional valves, each of which is assigned its own input module having two connectors. The plurality of directional valves are arranged in an alignment direction, in particular coinciding with the transverse direction described above, running orthogonally to the principal axis, wherein they are mounted independently of each other on a base body of the valve section. A plurality of or all of the plurality of directional valves can be mounted on a one-piece base body, or each on one of a plurality of base body modules, if the base body has a modular structure and has a plurality of base body modules juxtaposed in the alignment direction.

The plurality of directional valves are usefully supplied with a pressurised fluid to be distributed via a common feed channel and vented via at least one common vent channel. The pressurised fluid is in particular compressed air. The feed channel and at least one vent channel penetrate the valve section in the alignment direction, wherein they each usefully discharge at the mentioned valve mounting surface so that the fluid connects with each mounted directional valve. Each directional valve also communicates with one or two own working channels, to which an actuated, fluid-operated drive, in particular a pneumatic drive, can be connected.

In the context of a plurality arrangement of directional valves, it is advantageous if the valve section is penetrated by the electrical communication structure in the alignment direction, wherein the communication structure has a connector with the electrical connection with an electronic control unit and, in addition, each directional valve for receiving valve control signals provided by the electronic control unit is electrically connected to the electrical communication structure. The electronic control unit can be a component of the valve unit or designed as a component of the valve arrangement separate in relation to the valve unit.

BRIEF DESCRIPTION OF THE DRAWINGS

The invention is explained in more detail below using the attached drawing, in which.

DETAILED DESCRIPTION OF THE INVENTION

Figure 1:
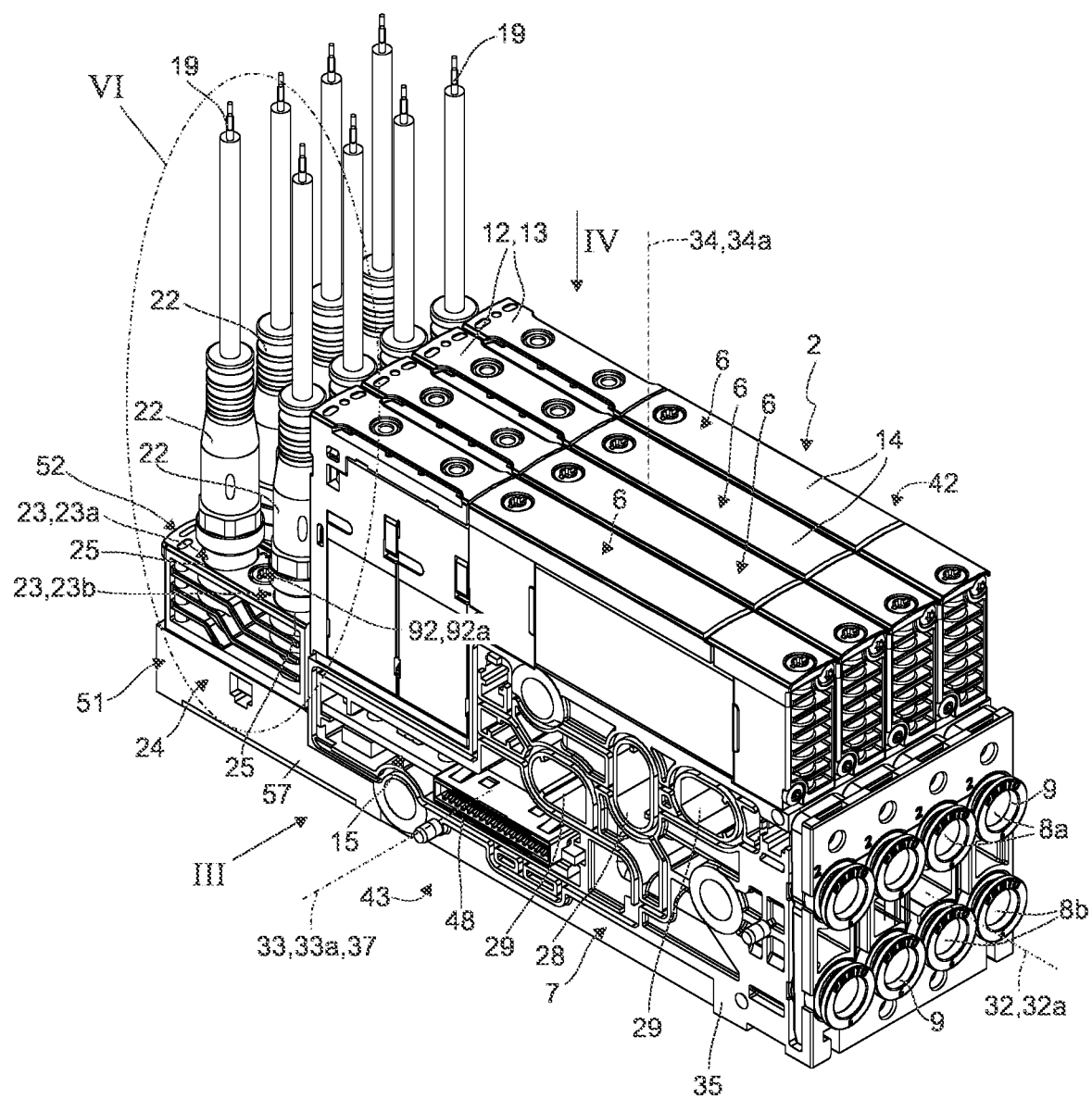
FIG. 1 shows a preferred embodiment of a valve unit of the inventive valve arrangement from a perspective view and without view of terminating modules in the operational state attached sideways to the valve section, as shown in FIG. 4, wherein the valve unit is equipped with a plurality of directional valves and a plurality of input modules, wherein the input modules are shown in an operational, mounted use position.
Figure 2:
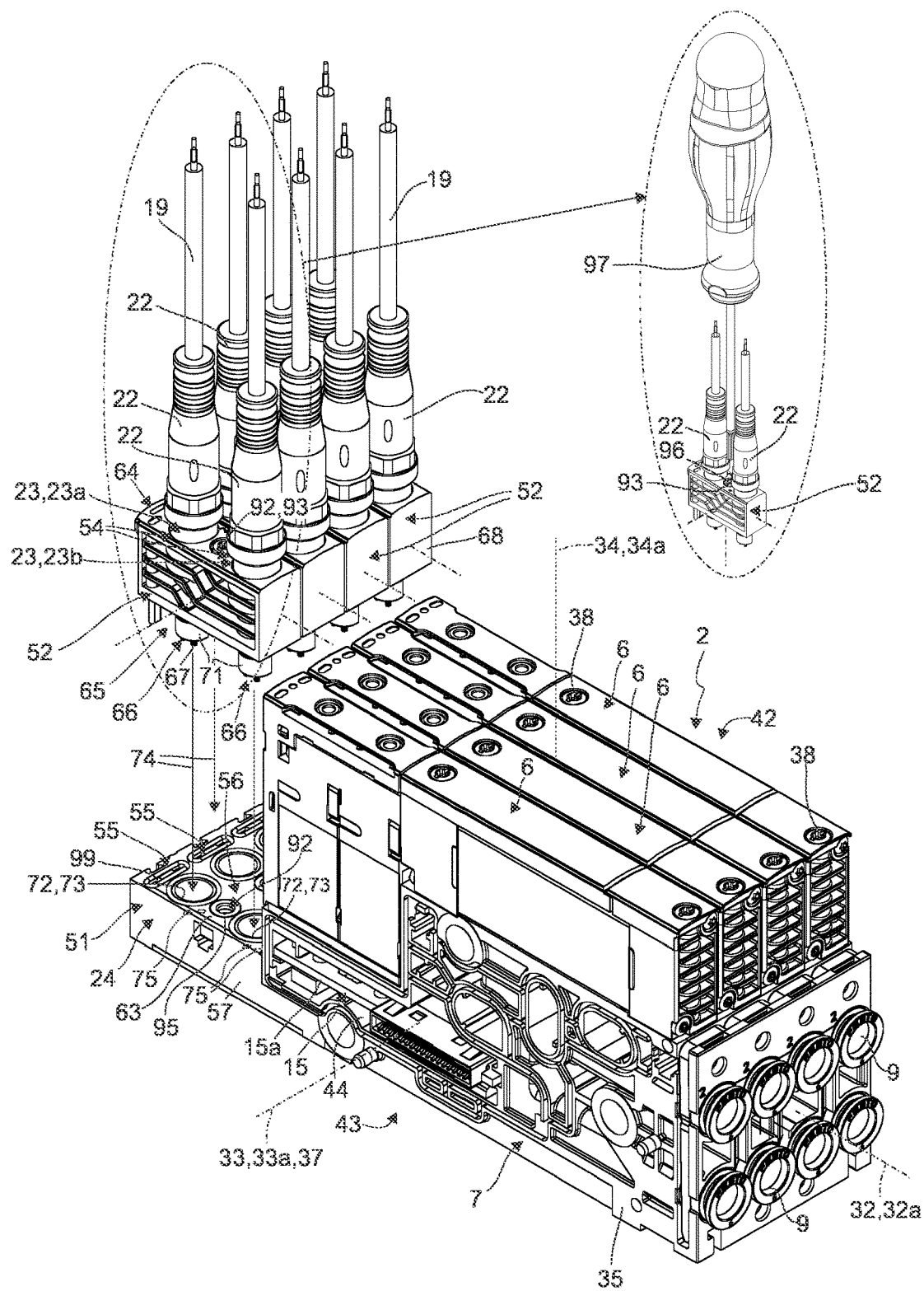
FIG. 2 shows the valve unit from FIG. 1 in a state in which the input modules are shown in a removed position, however already fitted with sensor plugs, which is referred to as the handling position, wherein the placing of input modules fitted with sensor plugs achieved within the framework of an advantageous installation method is indicated by arrows, wherein a separate figure bordered by a dot-dash line shows the use of a screwing tool to operate an attachment device to fix the use position of an input module fitted with sensor plugs.
Figure 3:
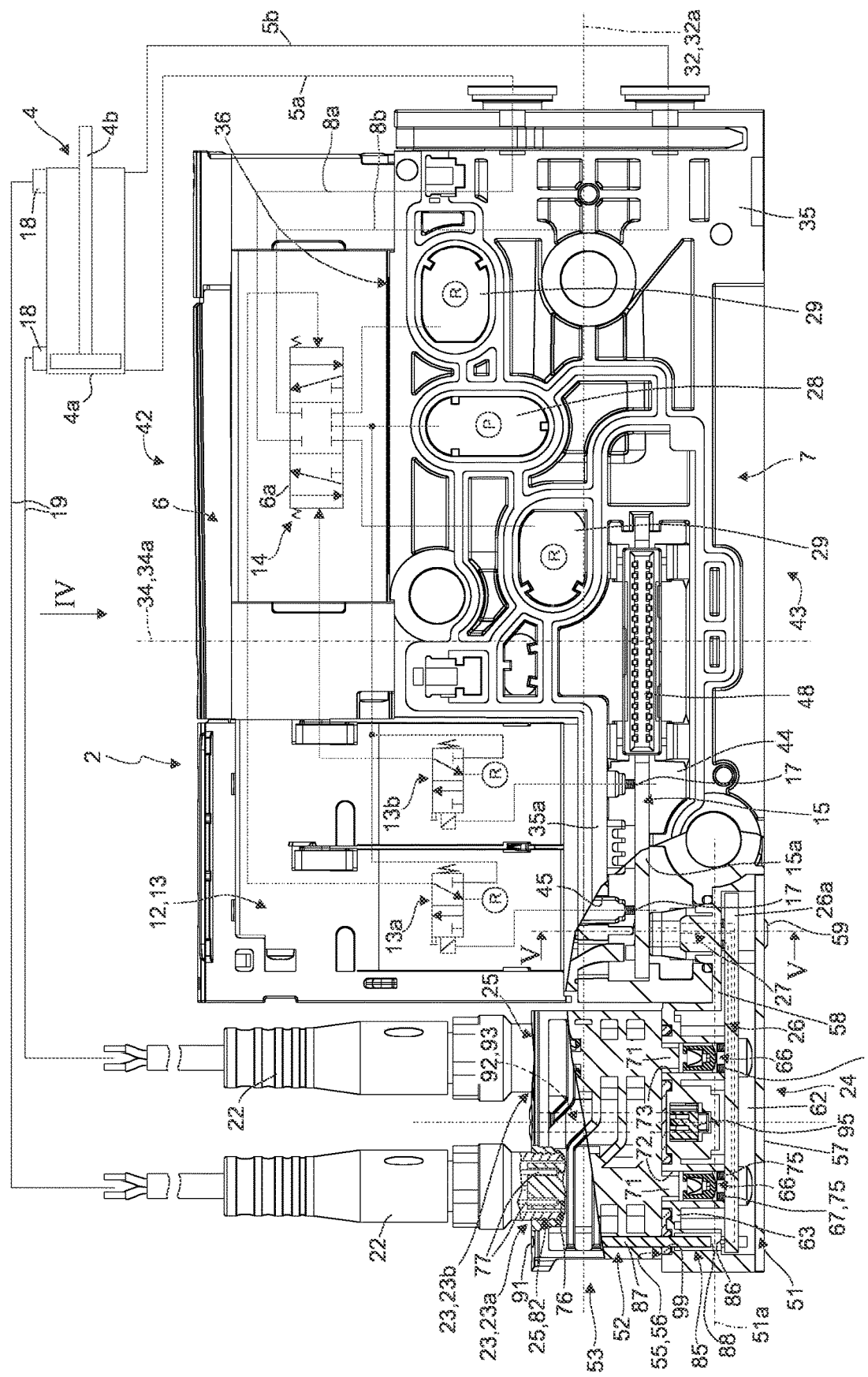
FIG. 3 shows a side view of the valve unit with line of sight in accordance with arrow III from FIG. 1, partially broken in the area of the input section, wherein the functionality of the directional valve is illustrated by symbols and wherein an actuated fluid-operated drive is schematically shown, which is connected fluidically to the valve section and which is fitted with sensors, which are connected to the inputs of the valve unit via sensor plugs.
Figure 4:
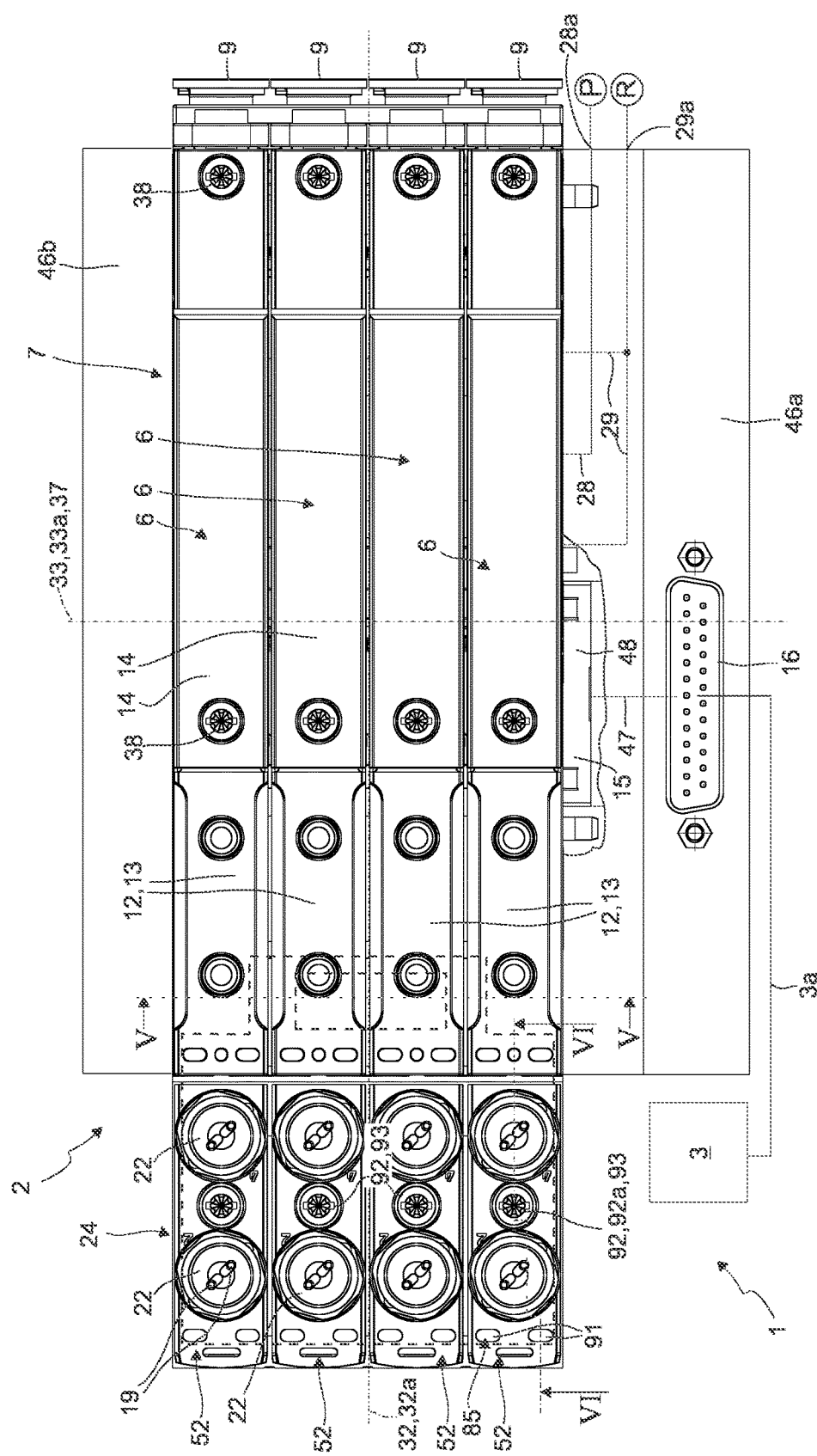
FIG. 4 shows a plan view of the valve unit from FIGS. 1 to 3 with line of sight according to arrow IV from FIGS. 1 and 3, wherein, sideways attached terminating modules, as well as schematically, an external electronic control unit are also shown.
Figure 5:
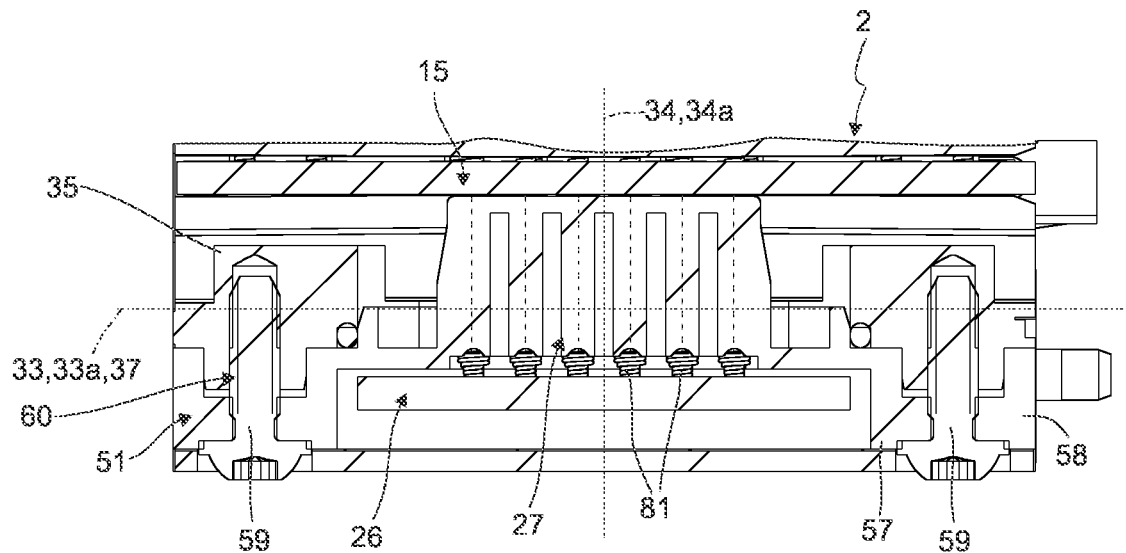
FIG. 5 shows a partial cross-section through the valve unit in accordance with intersection V-V from FIGS. 3 and 4.
Figure 6:
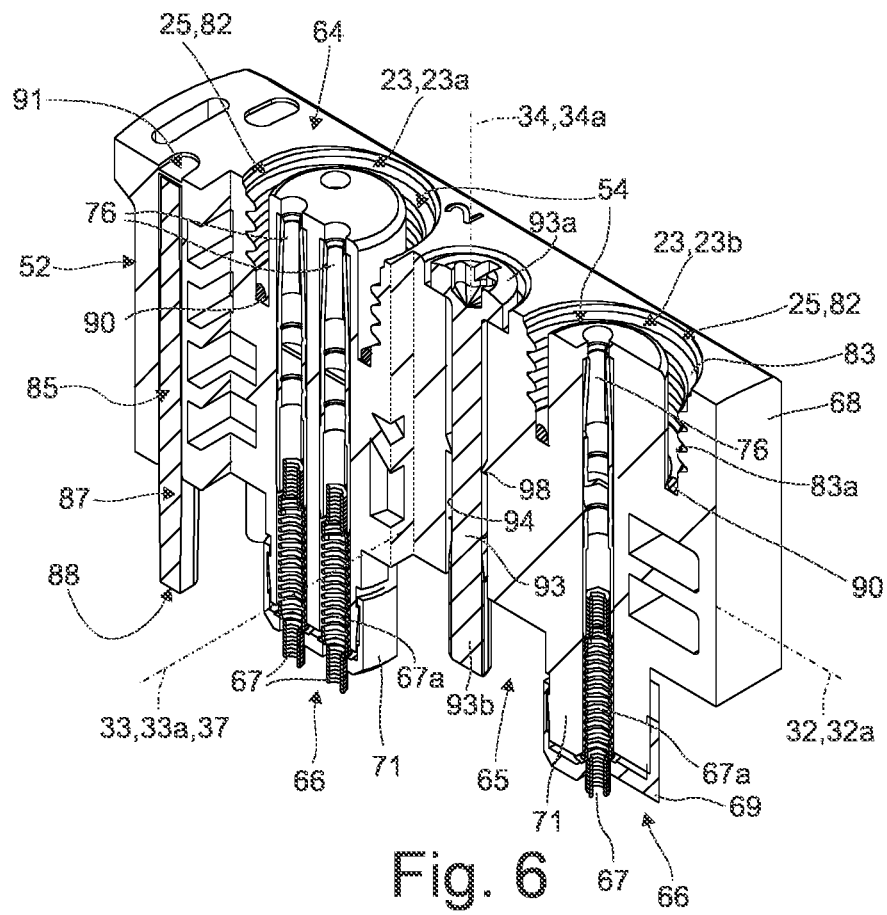
FIG. 6 shows a perspective individual representation of an input module in a tiered longitudinal section according to intersection VI-VI from FIG. 4.

FIG. 4 shows a plan view of a valve arrangement 1, which has a valve unit 2 as the main component, which is shown again in FIGS. 1 to 3, where some components have been omitted for better clarity.

As an example, the valve arrangement 1 additionally contains an electronic control unit 3, separate in relation to the valve unit 2, which is connected via an electric control cable 3a to the valve unit 2 and serves to operatively actuate the valve unit 2. According to an exemplary embodiment not illustrated here, the valve arrangement 1 can also consist of just valve unit 2.

A preferred use of the valve arrangement 1 is the actuation of fluid-operated drives 4, wherein such a fluid-operated drive 4 in a so-called double-acting construction is shown schematically in FIG. 3. The drive 4 has a drive member 4b movable in relation to a drive housing 4a, that separates two working chambers from each other in the drive housing 4a, which are each connected to one of two fluid lines 5a, 5b, which make it possible to control the loading of fluid in the drive member 4b, in order to move said member between two stroke end positions relative to the drive housing 4a.

For the fluidic actuation of the drive 4, the valve unit 2 is equipped with an electrically actuable directional valve 6. Preferably and by way of example, the valve unit 2 contains a plurality of such directional valves 6, which permits simultaneous fluidic actuation of a plurality of drives 4. Further description is based on a valve unit 2 being equipped with a plurality of directional valves 6, although the valve unit 2, according to an exemplary embodiment not illustrated here, can also be equipped with just one single directional valve 6.

The directional valves 6 are components of a valve section 7 of the valve unit 2, in which two working channels 8a, 8b per directional valve 6 are designed, which on the one hand, communicate with a directional valve 6 and on the other hand discharge at an external surface of the valve section 7 with a working connection 9, to which one of the two fluid lines 5a, 5b leading to the fluid-operated drive 4 is connectable or connected.

The directional valves 6 are of an electrically actuable construction and are each equipped with a valve drive 12 actuable by electrical valve control signals. As an example, each directional valve 6 is of an electropneumatically piloted design, wherein the valve drive 12 is formed by a pilot valve device 13, which is combined with a main valve 14 into an assembly as a directional valve 6. The pilot valve device 13 is able to actuate the main valve 14 pneumatically in order to set one of a plurality of switch positions of the directional valve 6, which are responsible for pressurising or venting the working connections 9.

The electrical valve control signals are suppliable to the directional valves 6 via a communication structure 15 arranged inside the valve section 7, which is connected to an externally accessible electromechanical connector 16, to which the electronic control unit 3 is connectable or connected. The communication structure 15 is in electrical contact with the valve drive 12 of each directional valve 6 inside the valve section 7 in individual contact areas 17.

With the electrical actuation of the directional valves 6, electrical sensor signals can be detected, which originate from sensors 18, arranged on the fluid-operated drive 4 activated by a corresponding valve unit 2. Typically, two sensors 18 are assigned to each directional valve 6, which are position sensors which are able to capture at least one stroke position of the drive member 4b, wherein it is in particular provided that each sensor 18 can capture one of two possible stroke end positions of the drive member 4b and output the relevant sensor signals.

Figure 7:
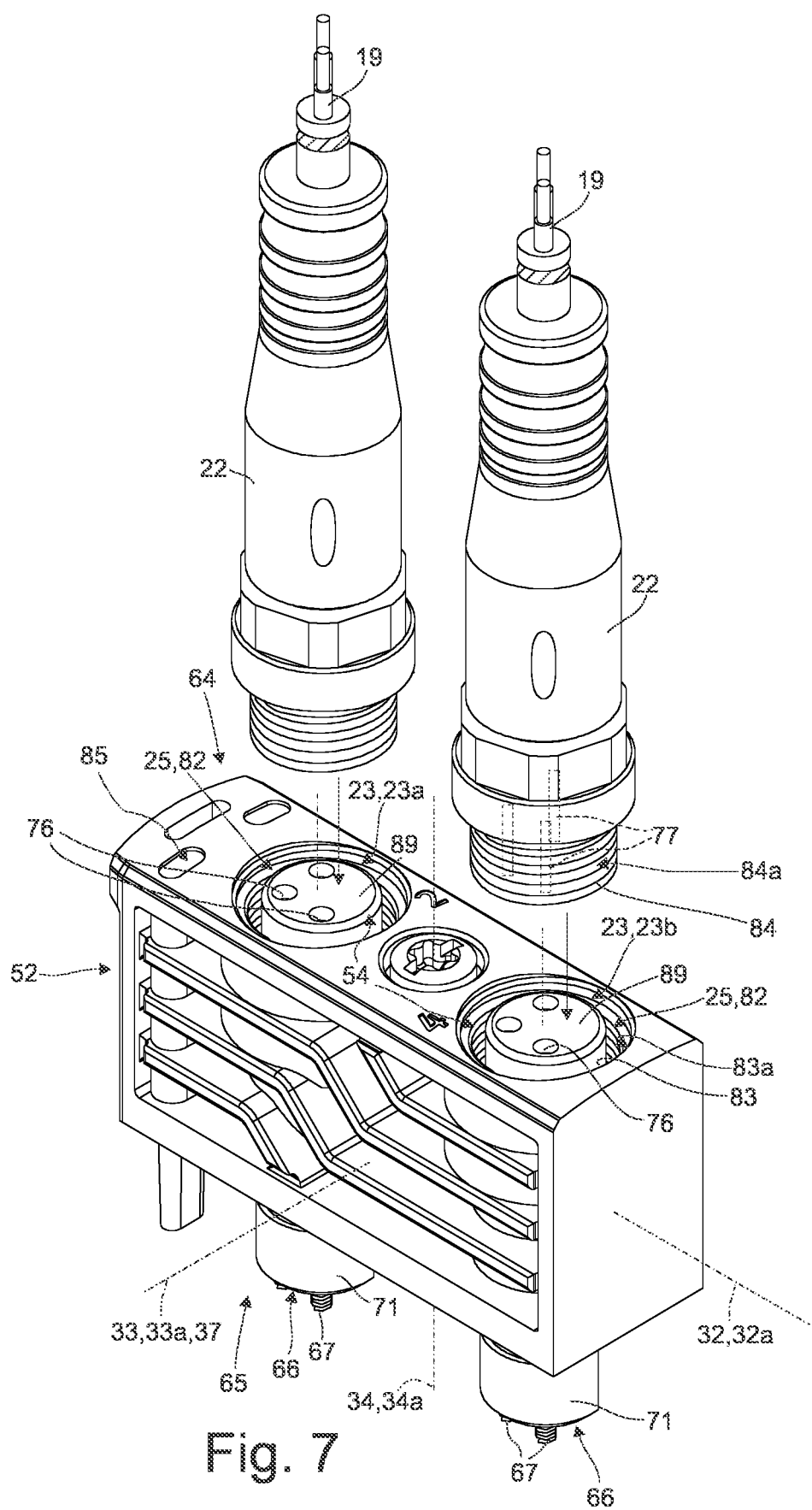
FIG. 7 shows an isometric individual representation of an input module according to section VII in FIG. 1, wherein the sensor plugs are shown in the non-connected state.
Figure 8:
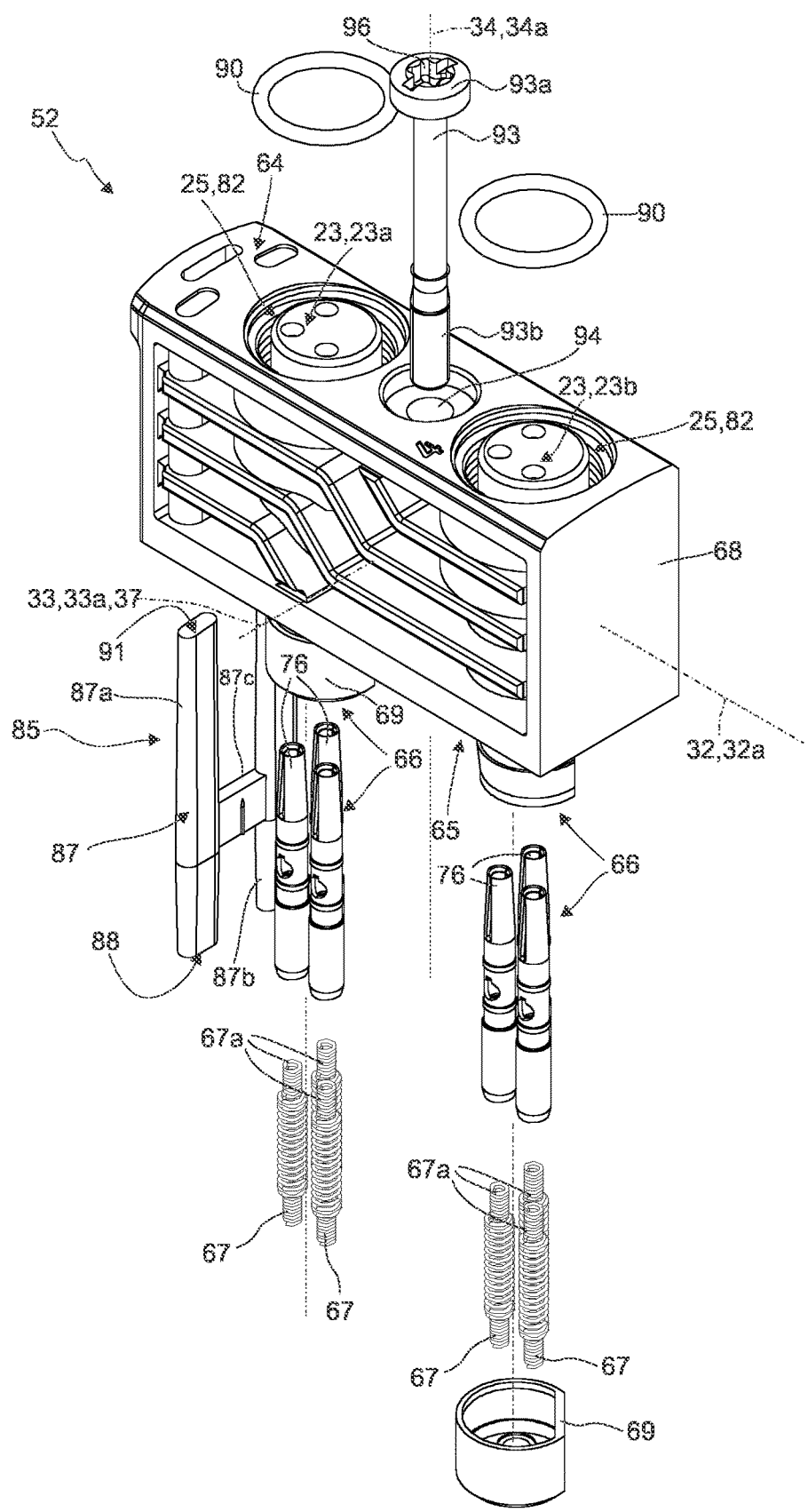
FIG. 8 shows an isometric exploded representation of the input module.

The sensors 18 designed in particular as position sensors and, for example, as hall sensors are each connected via a multicore electrical cable, described as a sensor cable 19, to its own sensor plug 22. The valve unit 2 has a component equipped with a plurality of electrical inputs 23 and therefore described as input section 24, which is attached to the valve section 7. Each electrical input 23 has an electromechanical plug-in connector 25, to each of which one of the sensor plugs 22 is releasably connectable or connected, wherein FIGS. 1 to 4 show a connected state of the sensor plugs 22 and FIG. 7 shows a non-connected state of the sensor plugs 22.

The input section 24 has an internal electrical conductor arrangement 26, which on the one hand is electrically connected to the existing electrical inputs 23, more precisely their plug-in connectors 25, and on the other hand is electrically connected to the electrical communication structure 15. The latter is usefully achieved via an electromechanical connection device 27, which is preferably arranged inside the valve section 7.

In this manner, electrical sensor signals output by the sensors 18, which can also be described as feedback signals, can be transmitted sensor-specific via the sensor cables 19, the sensor plugs 22, the plug-in connectors 25, the electrical conductor arrangement 26 and the communication structure 15 to the electronic control unit 3, which, depending on the sensor signals received, is able to generate the valve control signals intended for the directional valves 6 and feed these to the directional valves 6 via the communication structure 15.

It is clear that signal processing in relation to the sensor signals can also be achieved directly on board the valve unit 2 without the aid of the electronic control unit 3, for example in an internal central or decentralised evaluation electronics system of the valve unit 2, which, for example, is achieved by means of electronic components of the electrical conductor arrangement 26 and/or the communication structure 15.

The directional valves 6 are in particular conceived as multidirectional valves and preferably have a 5/2-way valve function or according to the illustrated exemplary embodiment a 5/3-way valve function. The aforesaid valve function is implemented, for example, in the main valve 14, which is actuable by the pilot valve device 13 by means of fluid force, which is achieved, for example, by means of two electrically actuable pilot valves 13a, 13b. The pilot valves 13a, 13b are usefully designed as 3/2-directional valves, in particular as solenoid valves.

A feed channel 28, which is connected to an external pressure source P, and at least one and in particular two vent channels 29, which is in constant communication with the atmosphere R, extend in the valve section 7 on operation of the valve arrangement 1. Each directional valve 6 is connected to the aforesaid channels 28, 29 and can be moved into different switch positions by means of the assigned valve drive 12, in which the feed channel 28, the vent channels 29 and the working channels 8a, 8b are fluidically connected to each other or separated from each other in different configurations. By way of example, the respective switch position can be set by a valve member 6a of the main valve 14 indicated by a symbol only, which is positionable in different switch positions through the loading of fluid generated by the pilot valve device 13.

Each directional valve 6 can adopt, in particular, two switch positions, in which one of the two working channels 8a, 8b is connected to the feed channel 28 and the other of the two working channels 8b, 8a is connected to a vent channel 29. In this manner, a lifting movement by the drive member 4b of the connected drive 4 can be generated in one of two opposite directions. The exemplary directional valves 6 also make a third switch position or middle position possible, in which the two working channels 8a, 8b are separated from both the feed channel 28 as well as the at least one vent channel 29, so that the drive member 4b does not receive any fluidic driving force.

The valve unit 2 extends along an imaginary primary axis 32, the axial direction of which is referred to as primary direction 32a. Furthermore, the valve unit 2 has an extension in an axial direction of a transverse axis 33 referred to as transverse direction 33a and in an axial direction of a vertical axis 34 referred to as vertical direction 34a. The transverse axis 33 runs vertical to the primary axis 32 and the vertical axis 34 extends vertical to both the primary axis 32 and the transverse axis 33.

The input section 24 joins the valve section 7 in the primary direction 32a. According to the illustrated exemplary embodiment, the valve section 7 usefully contains a base body 35, in which the working channels 8a, 8b, the feed channel 28 and the at least one vent channel 29 are designed, and is attached to the input section 24. A valve mounting surface 36 is designed on the base body 35, on which the directional valves 6 in particular are mounted independently of each other. The fixing is usefully achieved by means of valve fixing screws 38.

The plurality of directional valves 6 are arranged adjacent to each other in a direction of alignment 37 indicated by a dot-dash line, wherein, as an example, the direction of alignment 37 coincides with the transverse direction 33a. The valve mounting surface 36 is divided into a plurality of mounting points, arranged adjacent to each other in the alignment direction 37, which can each be mounted or are mounted with one of the directional valves 6. The feed channel 28 and the at least one vent channel 29 extend in the base body 35 in the alignment direction 37 and discharge at the valve mounting surface 36 for each mounting point, so that they communicate with the internal valve channels of the directional valve 6 mounted on the respective mounting point. The working channels 8a, 8b each discharge in pairs only at one of the mounting points, so that each directional valve 6 is only connected to two individual working channels 8a, 8b.

Each directional valve 6 has a valve housing, in which the internal valve channels are designed and via which the directional valve 6 is set on the valve mounting surface 26 in the areas of the assigned mounting point.

The valve unit 2 has a top side 4 oriented in the vertical direction 34a and a bottom side 43 opposite to this in the vertical direction 34a. Preferably, the valve mounting surface 36 faces the top side 42.

As an example, the communication structure 15 is designed as a line of communication, which extends in the alignment direction 37 inside the base body 35. A cavity described as a communication channel 44 is designed in the base body 35, in which the communication structure 15 is incorporated. For example, the communication structure 15 is formed from a circuit board arrangement 15a, which consists of at least one circuit board and which has electrical contact surfaces in the contact areas 17, with which the pilot valve device 13 is in electrical contact. A base body wall 35a of the base body 35 separating the valve mounting surface 36 from the communication channel 44 has wall apertures 45, through which the pilot valve devices 13 project in order to contact the contact surfaces of the communication structure 15.

The valve section 7 usefully has a first and second terminating module 46a, 46b, each of which is mounted facing in the alignment direction 37 on one of the two end faces of the base body 35. The two terminating modules 46a, 46b close the feed channel 28, the at least one vent channel 29 and the communication channel 44. The aforesaid electromechanical connector 16 is arranged externally on the first terminating module 46a and communicates via an internal electrical conductor 47 with an internal electromechanical connector 48 attached on the end face of the circuit board arrangement 15a.

A connection opening 28a communicating with the feed channel 28 and at least one vent opening 29a communicating with the at least one vent channel 29 are designed on at least one of the two terminating modules 46a, 46b, for example on the first terminating module 46a. Connection of the external pressure source P and venting of the at least one vent channel 29 to the atmosphere R via the vent opening 29a is achieved via the connection opening 28a.

The base body 35, consisting in particular of plastic material, is for example designed in one piece. In an exemplary embodiment not illustrated here, it is segmented in the alignment direction 37 and contains a plurality of juxtaposed base body modules, which are each mounted with one or a plurality of directional valves 6.

The input section 24 has a component described as a connector carrier 51, which carries the plug-in connectors 25 of all the electrical inputs 23 and via which the attachment of the input section 24 to the valve section 7 is achieved. The plug-in connectors 25 of the electrical inputs 23 are however arranged not directly on the connector carrier 51, but on input modules 52 of the input section 24 separated in relation to the connector carrier 51 and handleable independent of each other. These input modules 52 are mountable on the connector carrier 51 adopting one of the use positions shown in FIGS. 1, 3 and 4, so that the connector carrier 51 only carries the electromechanical connectors 16 indirectly.

Each of the existing directional valves 6 is assigned its own input module 52, which has two plug-in connectors 25. Each directional valve 6 is functionally assigned one of the input modules 52, which means that the sensor signals that can be fed to the two plug-in connectors 25 of an input module 52 are used for the electrical actuation of the functionally assigned directional valve 6. By way of example, this means that the end position sensor signals of those sensors 18 arranged on the drive 4 which can be actuated by the directional valve 6 functionally assigned to the input module 52 are fed back via the sensor plugs 22 connected to one of the input modules 52.

Preferably the directional valves 6 and input modules 52 assigned to each other are each arranged in a line in the principal direction 32*a*. In this way, the input module 52 is aligned so that its two plug-in connectors 25 are likewise arranged successively in the principal direction 32*a*. This results in a very slim construction. By way of example, the valve unit 2 has a front side 53 oriented in the principal direction 32*a*, wherein all input modules 52 arranged in the use position on this front side 53 are arranged in front of the following directional valves 6. In adopting their use position, the input modules 52 are arranged in the alignment direction 37 in a row adjacent to each other in the same way as the plurality of directional valves 6.

The two inputs 23 each assigned to a directional valve 6 and achieved with the aid of one and the same input module 52, which for better distinction are also described below as a first electrical input 23*a* and second electrical input 23*b*, are in joint nomination below also described as an input pair 54.

Each input module 52 is placed on a module assembly point 55 designed on the connector body 51 when brought into its use position. The number of assembly points 55 usefully corresponds to the number of input modules 52. To guarantee the explained functional assignment between the input modules 52 and the directional valves 6, the module assembly points 55 are arranged adjacent to each other in the alignment direction 37 and in an area upstream of the valve section 7 towards the front side 53.

The module assembly points 55 are formed from sections of a module assembly surface 56 of the connector carriers 51, which faces the vertical direction 34*a* of the top side 42 of the valve unit 2 and therefore has, for example, the same alignment as the valve mounting surfaces 36.

The connector carrier 51 is preferably designed in multiple parts, wherein it has a carrier housing 57, on which the module assembly surface 56 is designed. The connector carrier 51 is attached to the base body 35 via the carrier housing 57, which is preferably made of plastic. By way of example, this is achieved in that the carrier housing 57 has a tongue-shaped attachment section 58 facing the valve section 27, which engages the base body 35 in the area of the bottom side 43 in the principal direction 32*a*, and which by means of fixing screws 59, which penetrate and form a housing attachment device 60, is screwed on to the base body 35 from below.

The connector carrier 51 is usefully designed at least essentially in a plate shape, wherein it is aligned so that it extends with its main extension, described as a plate plane 51*a*, orthogonally to the vertical axle 34. This is due to the plate-shaped form on a correspondingly flat construction of the carrier housing 57. The carrier housing 57 projects, for example, from the base body 35 in the vertical direction 34*a* to the top side 42.

The carrier housing 57 contains a housing interior 62, in which the afore-mentioned electrical conductor arrangement 26 of the input section 24 is housed. The carrier housing 57 has a wall section, described below as a mounting wall 63, which closes the housing interior 62 on a top side facing in the vertical direction 34*a* and whose external surface facing the housing interior 62 in the vertical direction 34*a* forms the module assembly surface 56.

Each input module 52 has a module top side 64, which in the use position faces the top side 42 of the valve unit 2, and, in this respect, an opposite module bottom side 65. The two plug-in connectors 25 are arranged on the module top side 64 in the case of each input module 52. Each input module 52 has two module connectors 66 on the module bottom side 65, through which, in the use position, an electromechanical connection to the connector carrier 51 is achieved. The means for achieving this electromechanical connection are designed so that the input module 52 is fixed in the use position in a centred position in relation to the connector carrier 51, in other words, adopts a mechanically predetermined position. The position centring relates to a plane orthogonal to the vertical axis 34, on which, for example, the module assembly surface 56 also lies.

Preferably, the input module (52) has a module body (68) consisting of a plastic material, which is usefully designed rectangular-shaped. The length of the module body 68 is greater than its width, wherein the module body 68, in the use position of the input module 52, is aligned so that its longitudinal direction, determined by the length, coincides with the principal direction 32*a*.

To achieve the position centring, each module connector 66 preferably has on the module bottom side 65 a centring projection 71, which projects downwardly in the vertical direction 34*a* and which is formed by a section of the module body 68. The two centring projections 71 are usefully cylindrical in form and arranged behind each other in the longitudinal direction of the module body. The mounting wall 63 has two wall apertures 72 on each module assembly point 55, each of which incorporate a centring structure 73 of the connector carrier 51 and whose cross-section is designed complementary to the external cross-section of the each assigned centring projection 71. The two wall apertures 72 are arranged on each module assembly point 55 spaced apart from one another in the principal direction 32*a*, wherein the distance is equivalent to the mutual distance between the two centring projections 71 of the assigned input module 52.

As part of their placing movement 74, indicated by arrows in FIG. 2, each input module 52 with the two module connectors 66 can be attached in advance to a module mounting point 55, wherein the module connectors 66 with their relevant centring projection 71 immerse to effect a position centring in the assigned wall aperture 72, so that they protrude into the housing interior 62 of the carrier housing 57. In this manner, the centring projections 71 are supported on their external circumferential surface by the internal circumferential surface of the assigned wall aperture 72. With downward-angled surface sections of the module body 68 extending around the centring projections 71, the input module 52 lies in the use position on the external surface of the mounting wall 63 facing the housing interior 62.

To achieve the electrical connection to the connector carrier 51, each module connector 66 has a plurality of electrical contacts, described as module contacts 67. With the placing movement 74, the module contacts 67 come into contact with electrical contacts, described as carrier contacts 75, of the electrical conductor arrangement 26. The electrical conductor arrangement 26 has a number of carrier contacts 75 for each module connector 66, corresponding to the number of module contacts 67, which are located opposite to the assigned wall aperture 72 in the vertical direction 32a. The module contacts 67 are arranged with their end face on the centring projections 71, so that they come into electrical contact with the carrier contacts 75 correctly assigned, when the input module 52 is placed on a module assembly point 55 during a placing movement 74.

Each plug-in connector 25 has a plurality of electrical contacts described as input contacts 76, each of which are electrically connected to one of the module contacts 67. The electrical connection is usefully achieved inside the module body 68. By way of example, the input contacts 76 are at least partially designed sleeve-shaped and pressed immovably into the module body 68.

The module contacts 67 are preferably formed by the end sections of elongate spring-loaded contact elements 67a, so that, in the use position of the input module 52, they are pressed onto the carrier contacts 75 with a sufficient level of contact force. The spring-loaded contact elements 67a, preferably designed in the manner of coil springs, lie inside the module body 68 each on one of the preferably sleeve-shaped input contacts 76. Preferably the centring projections 71 each contain a retaining cap 69 belonging to the module body 68, through which the assigned spring-loaded contact elements 67a are prevented from falling out of the module body 68.

It is clear that, for example, plug-in contacts can alternatively also be used.

The number of input contacts 75 per plug-in connector 25 corresponds to the number of electrical plug-in contacts 77 designed on the assigned sensor plug 22. When a sensor plug 22 is connected, the plug-in contacts 77 and the input contacts 76 are in engagement with each other in pairs, so that an electrically conductive connection is made between the sensors 18 and the module contacts 67.

The carrier contacts 75 of the electrical conductor arrangement 26 are electrically connected with the electrical communication structure 15 via the aforesaid electromechanical connection device 27, so that the above-described transmission of signal from the sensors 18 to the communication structure 15 and, if applicable, to the electronic control unit 3 is guaranteed.

The electrical conductor arrangement 26 is usefully achieved according to the illustrated exemplary embodiment by the use of at least one and preferably exactly one circuit board 26a, which is arranged and attached in the housing interior 62. The carrier contacts 75 are designed as components of the circuit board 26a.

The electromechanical connection device 27 is achieved, in a comparative manner to the contact measures achieved between the input module 52 and the connector carrier 51, by use of spring-loaded contacts 81, but can also be designed, for example, as a plug connection. Components of the connection device 27 are, for example, in part on the circuit board 26a and in part on the circuit board arrangement 15a.

The electromechanical plug-in connectors 25 of the electrical inputs 23 are usefully designed as multipole connectors with threads 82 and in particular as M8 connectors, which is the case in the illustrated exemplary embodiment. Preferably, a three-pole construction, although also another number of poles would be possible. Preferably and by way of example, the connectors with threads 82 are designed as M8 connectors. The plug contacts 77 are in this case designed as contact pins, which can on connection of the sensor plug 22 immerse into the assigned input contacts 76.

The connected state of each sensor plug 22 can be usefully ensured by a screw connection. For this for example, each plug-in connector 25 has an indentation 83 designed in the module body 68 with a radially inward-facing internal thread 83a, while the sensor plug 22 has a rotatable sleeve-shaped end section 84 with external thread 84a. By rotating the sleeve-shaped end section 84, the external thread 84a is screws into the internal thread 83a, so that the connected sensor plug 22 is releasably fixed to the input module 52. In this manner, the sleeve-shaped end section 84 is immersed into the cylindrically contoured indentation 83.

Usefully the two indentations 83 are each annularly designed and surround a dome-shaped section 89 of the module body 68, which has openings on the end face, through which the input contacts 76 are accessible to the plug-in contacts 77. Due to the indentation 83, a seal ring 90 is usefully arranged enclosing the dome-shaped section 89, on which the end face of the screwed-in sleeve-shaped end section 84 is placed, so that the plug connection between a sensor plug 22 and the input module 52 is sealed.

It is useful if each input module 52 is equipped with an illuminated display device 85, through which at least one operating state of each sensor 18 connected to the input module 52 can be visualised through the output of a light signal.

The illuminated display device 85 preferably contains two light output surfaces 86 designed as components of the electrical conductor arrangement 26, which are, for example, achieved by means of light diodes and which are electrically configured so that they output a light signal on activation of an assigned sensor 18. The light output is, for example, controlled by the electronic control unit 3 or by another internal control electronic system of the valve unit 2.

An optical waveguide structure 87 also belongs to the illuminated display device 85, which extends in the vertical direction 34a through the module body 68 of the input module 52 and which has on the module bottom side 65 two light coupling surfaces 88, which in the use position of the input module 52, each lie opposite one of the light output surfaces 76 of the connector carrier 51. Preferably the optical waveguide structure 87 has two end sections, which project downwardly via the module body 68, on each of which one of the light coupling surfaces 88 is designed and which, in the use position of the input module 23, protrude through wall openings 99 of the mounting wall 63 into the housing interior 62.

The optical waveguide structure 87 also has two light output surfaces 91 on the module top side 64, each of which are light-conductively connected to one of the light coupling surfaces 88. In this manner, the light signals output by the light output surfaces 86 of the conductor arrangement 26 are made visible in the area of the module top side 64, which conveniently permits the switching state of the connected sensors 18 to be visually monitored.

Preferably, the optical waveguide structure 87 is designed in one piece and contains two light-conducting elements 87a, 87b which are arranged adjacent to each other and in particular designed rod-shaped and which are fixedly connected to each other by a connecting bridge 87c. Each of the two light-conducting elements 87a, 87b has one of the light coupling surfaces 88 on the one end face and one of the light output surfaces 91 on the other end face.

The light output surfaces 91 are usefully located on the module top side 64 in an end area of the module body 68 facing the valve section 7. They are preferably arranged adjacent to each other in the transverse direction 33a. In the use position of the input module 52, the two plug-in connectors 25 lie between the valve section 7 and the light output surfaces 91.

Each input module 52 is assigned an attachment device 92, which makes it possible to attach the input module 52 to the connector carrier 51 in a releasable manner by adopting its use position or by staying in its use position.

Preferably the attachment device 92 is designed in a manner which makes it possible to releasably attach the input module 52 to the connector carrier 51 in a state when the two sensor plugs 22 are already connected to the input module 52. This results in the advantageous possibility, when installing the valve arrangement 1, to connect the sensor plugs to the input module 52 in a handling position of the input module 52, not yet attached to the connector carrier 51, and then to retain the input module 52 together with the connected sensor plugs 22 in the use position and releasably attach them there by actuation of the attachment device 92. This method of installation can be implemented particularly quickly and easily.

Preferably and according to the illustrated exemplary embodiment, the attachment device 92 is designed as a screw fixing device 92a.

The screw fixing device 92a is preferably achieved by means of a single fixing screw 93, which can be inserted in a screw through-hole 94 penetrating the input module 52 or its module body 68. The screw through-hole 94 penetrates the input module 52 in relation to the use position, preferably in the vertical direction 34a. The fixing screw 93 has a screw head 93a, which can be supported on the module top side 64 on the module body 68. The fixing screw 93 also has a threaded shaft 93b, the length of which has been selected so that it protrudes from the input module 52 when a fixing screw 93 is inserted on the module bottom side 65.

For each input module 52, a fixing nut 95 is unrotatably fixed in the connector carrier 51, in particular on or in the carrier housing 57, in an area which, in the use position of the input module 52, is flush with the screw through-hole 94. For example, the fixing nut 95 is pressed and/or glued into a wall section of the carrier housing 57. By way of example, the fixing nuts 95 are retained in the mounting wall 63.

The screw head 93a has an actuating structure 96, which permits the attachment of a manually manageable screwing tool 97, illustrated in FIG. 2, in particular a screwdriver, in order to introduce torque.

The assembly of an input module 52 on the connector carrier 51 is achieved by a preferred installation method in that the input module 52, with sensor plugs 22 already connected to the plug-in connectors 25 and, in particular, fixing screw 93 already inserted in the screw through-hole 94 as part of a placing movement 74 with the module bottom side 65, is placed on a desired module assembly point 55. Next, by means of the screwing tool 97 already or subsequently attached to the attachment structure 96, the fixing screw 93 is screwed into the assigned fixing nut 95 and tightened. By means of measures carried out in reverse order, an input module 52 can, if required, also be removed from the connector carrier 51 together with the connected sensor plugs 22.

Preferably the fixing screw 93 is captively held in the screw through-hole 94. By way of example, there is at least one narrowing 98 in the longitudinal extent of the screw through-hole 94, through which the fixing screw 93 can be screwed with a threaded section of its threaded shaft 93b and which subsequently forms a stop for the threaded section, so that the fixing screw 93 can no longer fall out.

Preferably the screw through-hole 94 is designed between the two plug-in connectors 25, so that the input module 52 is securely fixable in a central area.

Since the removable input modules 52 present the possibility of connecting and removing the sensor plugs 22 when the input module 52 is in its state not mounted on the connector carrier 51, described above as the handling position, the two plug-in connectors 25 for each input module 23 can be placed very closely to each other, without impairing the process of connecting or releasing the sensor plugs 22. For the same reason, the module bodies 68 of the input modules 52 can be designed to be very narrow in the transverse direction 33a without impairing operability. By way of example, the width of the module body 68, measured in the transverse direction 33a, is only minimally greater than the diameter of the indentations 83 provided with an internal thread 83a.

The invention claimed is:

1. A valve arrangement comprising:
a valve unit extending in a principal direction along a principal axis, which has a valve section with at least one electrically actuable directional valve and an input section arranged adjacent to the valve section, in this respect in the principal direction, with a plurality of electrical inputs designed for the reception of electrical sensor signals,
wherein each electrical input has an electromechanical plug-in connector for releasably connecting a sensor plug arranged on a sensor cable connected to a sensor,
wherein the valve unit has a communication structure electrically connected to the at least one directional valve and the electrical inputs, which is designed for the electrical transmission of valve control signals determined for the directional valve and of electrical sensor signals received via the electrical inputs,
wherein the input section has a connector carrier attached to the valve section carrying the electromechanical plug-in connectors of the electrical inputs, and
wherein the at least one directional valve is assigned a pair of inputs comprising two adjacent electrical inputs,
wherein the two electromechanical plug-in connectors of the input pair are arranged on an input module of the input section separate from the connector carrier, which also has two electromechanical module connectors each electromechanically connected to one of the two electromechanical plug-in connectors,
wherein the input module, in the connected state to the plug-in connectors of the sensor plugs, can be or is releasably mounted on a module assembly point designed on the connector carrier on adopting a use position, in which it firstly engages in a centred position with its two module connectors in centring structures of the connector carrier and, secondly is in electrical contact with the electrical carrier contacts of the connector carrier arranged on the module assembly point and electrically connected to the communication structure, wherein an attachment device is assigned to the input module, with which, in the connected state to the plug-in connectors of the sensor plugs, it can be releasably attached in its use position to the connector carrier.

2. The valve arrangement according to claim 1, wherein the input module is usefully arranged lying on a line in its use position with the assigned directional valve in the principal direction, wherein the two plug-in connectors of the input module are arranged successively in the principal direction.

3. The valve arrangement according to claim 1, wherein the input module is designed rectangular-shaped, wherein it usefully has a module body consisting of a plastic material.

4. The valve arrangement according to claim 1, wherein the valve unit has a transverse axis extending in a transverse direction, orthogonal to the principal axis, and a vertical axis extending in a vertical direction, orthogonal to the principal axis, wherein the electromechanical plug-in connectors of the input pair are arranged on a module top side, which is oriented in the vertical direction, of the input module, which is in the use position, and the module connectors on a module bottom side opposite the module top side of the input module, which is in the use position, wherein the carrier contacts are arranged in the vertical direction upward-facing on the connector carrier.

5. The valve arrangement according to claim 4, wherein the connector carrier is designed at least essentially in a plate shape and has a plate plane, extending orthogonally to the vertical axle.

6. The valve arrangement according to claim 1, wherein the connector carrier has a carrier housing attached to the valve section that contains an enclosure, in which an electrical conductor arrangement is located, which has the electrical carrier contacts and which is electrically connected to the communication structure, wherein a mounting wall of the carrier housing adjacent to the housing interior in the area of the carrier contact has a wall aperture acting as one of the centring structures, into which one of the module connectors of the input module adopting the use position during the position centring of the input module immerse and, at the same time, is in electrical contact with the assigned carrier contact, wherein the electrical conductor arrangement usefully contains at least one circuit board.

7. The valve arrangement according to claim 6, wherein each module connector has a cylindrical centring projection, which immerses centrally into one of the wall apertures of the carrier housing, when the input module adopts the use position, on which module contacts provided on the end face for contact with the carrier contacts are available, which are electrically connected to one of the two plug-in connectors inside the input module.

8. The valve arrangement according to claim 6, wherein the carrier housing is designed separately in relation to the valve section, wherein it is set on the valve section and attached to the valve section by means of a housing attachment device.

9. The valve arrangement according to claim 6, wherein the electrical conductor arrangement inside the valve section is electrically conductively connected to the communication structure via an electrical connection device.

10. The valve arrangement according to claim 1, wherein the electromechanical plug-in connectors of the input module are designed as multipole connectors with thread, usefully as M8 connectors and in particular as three-pole M8 sockets.

11. The valve arrangement according to claim 1, wherein the two electromechanical plug-in connectors of the input module are arranged on a module top side of the input module and the two module connectors of the input module are arranged on a module bottom side of the input module opposite the module top side, wherein the input module is penetrated by an optical waveguide structure, which has at least one light output surface arranged on the module top side of the input module and at least one light coupling surface arranged in the area of the module bottom side opposite a light output surface of the connector carrier in the use position.

12. The valve arrangement according to claim 1, wherein the attachment device assigned to the input module is a screw fixing device.

13. The valve arrangement according to claim 12, wherein the attachment device assigned to the input module has a fixing screw penetrating the input module and a fixing nut fixed in the connector carrier, wherein the fixing screw has a screw head, designed to be operated by means of a screwing tool, usefully arranged in the area between the two plug-in connectors.

14. The valve arrangement according to claim 1, wherein the at least one directional valve is connected to a feed channel, designed in the valve section and provided for connection with an external pressure source, and to at least one vent channel, also designed in the valve section for communicating with the atmosphere, wherein, by means of the directional valve based on the electrical valve control signals supplied to the directional valve, the pressurisation of at least one working channel, designed in the valve section and provided for fluidic connection to an actuated fluid-operated drive, can be controlled.

15. The valve arrangement according to claim 1, wherein the valve section contains a base body, to which the input section is attached.

16. The valve arrangement according to claim 15, wherein the base body has a valve mounting surface, on which the at least one directional valve is mounted and which usefully has the same spatial orientation as the module assembly point assigned to the directional valve.

17. The valve arrangement according to claim 1, wherein the valve unit has a plurality of directional valves arranged running in an alignment direction orthogonally to the principal axis, each of which is assigned its own module assembly point mounted or mountable with an input module on the input section.

18. The valve arrangement according to claim 17, wherein the at least one directional valve is connected to a feed channel, designed in the valve section and provided for connection with an external pressure source, and to at least one vent channel, also designed in the valve section for communicating with the atmosphere, wherein, by means of the directional valve based on the electrical valve control signals supplied to the directional valve, the pressurisation of at least one working channel, designed in the valve section and provided for fluidic connection to an actuated fluid-operated drive, can be controlled, and wherein the valve section of the feed channel and of the at least one vent channel is penetrated in the alignment direction, wherein each directional valve is fluidically connected both to the feed channel as well as to the at least one vent channel and also communicates with at least one own working channel.

19. The valve arrangement according to claim 17, wherein the electrical communication structure in the valve section which has at least one connector for electrical connection to an electronic control unit extends in the alignment direction, wherein each electrically actuable directional valve is electrically connected to the electrical communication structure for receiving valve control signals.

20. A method for installing a valve arrangement according to claim 1, wherein, in a handling position having been removed from the connector carrier, the sensor plugs of the input module which has been assigned at least one directional valve are connected to the plug-in connectors of the input module, after which the input module is set, together with the sensor plugs attached to it, in the use position on the connector carrier and attached to the connector carrier by means of the attachment device.

* * * * *